United States Patent [19]

Heady et al.

[11] 3,847,741

[45] Nov. 12, 1974

[54] TEMPERATURE-PROGRAMMED PROCESS FOR THE PRODUCTION OF LEVULOSE-BEARING SYRUPS

[75] Inventors: Robert E. Heady, Park Forest; William A. Jacaway, Jr., Downers Grove, both of Ill.

[73] Assignee: CPC International Inc., Englewood Cliffs, N.J.

[22] Filed: Oct. 2, 1972

[21] Appl. No.: 294,397

[52] U.S. Cl. ................... 195/31 F, 195/63, 195/68, 195/104, 195/115
[51] Int. Cl. ............................................. C12b 1/00
[58] Field of Search ......... 195/31 F, 66 R, 115, 104

[56] References Cited
UNITED STATES PATENTS

| | | | |
|---|---|---|---|
| 3,788,945 | 1/1974 | Thompson et al. | 195/31 F |
| 3,784,409 | 1/1974 | Nelson et al. | 195/31 F |

OTHER PUBLICATIONS

French et al., Methods in Enzymology Vol. XVI, pp. 3-30, Kustin ed., Academic Press, (1969), New York and London.

Primary Examiner—A. Louis Monacell
Assistant Examiner—Thomas G. Wiseman
Attorney, Agent, or Firm—Albert P. Halluin; Frank E. Robbins

[57] ABSTRACT

Levulose-bearing syrups are produced by passing a dextrose solution through a column or bed of an immobilized dextrose isomerase enzyme preparation. The useful life of the enzyme preparation is extended by conducting the isomerization initially at a low operating temperature, then increasing the temperature of operation after an initial decrease in enzyme activity has been observed.

25 Claims, No Drawings

TEMPERATURE-PROGRAMMED PROCESS FOR THE PRODUCTION OF LEVULOSE-BEARING SYRUPS

FIELD OF THE INVENTION

This invention relates generally to enzymatic isomerization. More particularly, the invention relates to improvements in continuous isomerization techniques.

DESCRIPTION OF THE PRIOR ART

The enzymatic hydrolysis of starch, for the production of corn syrup and corn syrup solids, is routinely conducted on a commercial scale to produce hydrolysates at D.E. values in excess of 95, utilizing what are essentially batch techniques.

The reported investigations of the enzymatic isomerization of dextrose and of starch hydrolysates, for the production of levulose-bearing products, have generally utilized batch isomerization techniques. An exemplary batch isomerization, for example, might be conducted in a stirred tank reactor at a temperature of about 70° C and at a pH of about 6.2, for an isomerization period of from about 40 to 60 hours. The enzyme dosage and conversion temperature are selected to obtain a desired levulose content in the end product. The pH of the syrup would be maintained at about 6.2 by either continuous or incremental additions of a basic material, such as sodium bicarbonate, during isomerization.

The selection of optimum operating conditions, for batch isomerization, is not easy. One initial variable that can be fixed, to some extent, is the particular enzyme preparation that is employed. Isomerase enzymes have their own individual characteristics and those derived from different microorganisms cannot be considered to have the same optimum conditions for action. For example, each enzyme preparation ordinarily will be found to have its own optimum pH, optimum temperature, metal requirement, temperature stability, and Michaelis constant, among other properties, as is reported, for example, by Dr. T. Sato, in "The Enzyme for the Isomerization of Glucose," in the Japanese publication Dempunto Gijutsu Kenkyu Kaiho 32, 81–88 (1965).

When the enzyme preparation is derived from a microorganism of the Streptomyces genus, the rate of levulose formation by the enzyme is much greater at 70° C than at 60° C. However, at pH 6.2, some of the advantages of conducting the isomerization at the higher temperature are lost, since the slightly acid pH reduces the rate of levulose formation and reduces enzyme stability. In fact, neither the 70° C operating temperature nor the slightly acidic pH are conducive to enzyme stability.

For effective batch isomerization, continuous mixing of the starch hydrolysate solution (syrup) is necessary. Unfortunately, when cells are used as the source of enzyme activity, the mixing action apparently imposes shear forces on the microbial cells that contain the enzyme. When cells are ruptured, the cellular fluids, including the enzyme, are released into the solution. The enzyme appears to be more susceptible to inactivation under these conditions, than enzyme that remains within intact cells.

Some consideration of the effect of temperature on isomerase has been reported in the literature. For example, two of the pioneer workers in the field, N. Tsumura and T. Sato of the Japanese Food Research Institute, published a series of papers entitled, "Enzymatic Conversion of D-Glucose to D-Fructose." In parts V and VI, which appear in Agr. Biol. Chem. 29, 1123–1128 and 1129–1134, respectively (1965), they describe the effects of temperature on an isomerase obtained from *Aerobacter cloacae*. They found that this enzyme lost the majority of its activity at 80° C in the presence of magnesium and at 90° C in the presence of cobaltous ion. Without the presence of stabilizing metal ions, exposure of their enzyme to a temperature of 70° C for a 10-minute period resulted in very substantial loss of enzyme activity. The addition of stabilizing metal ions enhanced heat tolerance, but even so, enzyme inactivation could be observed at about 80° C.

An article by Yoshimura, Danno and Natake, of Hyogo University, Japan, appearing in Agr. Biol. Chem. 30 (10), 1015–1023 (1966), entitled "Studies on Glucose Isomerizing Activity of D-xylose Grown Cells from *Bacillus coagulans*, Strain HN-68", reports the effect of temperature on the isomerase enzyme from their source microorganism. Maximum activity after 2 hours incubation was observed at 70° C. Maximum enzyme activity after 20 hours incubation was observed at temperatures in the range from 60° C to 65° C. Above 70° C, substantial inactivation of the enzyme could be observed after 2 hours, and when operating temperatures for given enzyme dose batches were compared after 20 hours, substantial enzyme inactivation appeared to occur above 65° C.

In the Journal of Food Science and Technology (Nipon Shokuhin Kogei Gakkaishi) 14 (12), 539–540 (1967), N. Tsumura and M. Ishikawa, in "Continuous Isomerization of Glucose by a Column of Glucose Isomerase," described a continuous isomerization technique in which a purified isomerase enzyme sample, derived from a strain of Streptomyces, was anchored on a DEAE-Sephadex bed in a column, to immobilize the enzyme. A glucose solution was then passed through the column. The column was heated by warm water at 60° C, which was passed through a jacket. An eventual reduction in enzyme activity was observed, although the authors were not certain whether the decrease in observed isomerization was caused by enzyme inactivation or by leaching of the enzyme from the column.

More recently, in a paper appearing in the text, "Fermentation Advances," edited by D. Perlman, Academic Press, 1969, beginning at page 561, Dr. Takasaki and his associates from the Japanese Fermentation Research Institute have described a continuous column isomerization and have characterized the heat stability of an isomerase enzyme derived from a particular strain of Streptomyces. They observed enzyme inactivation after 10 minutes at temperatures above 70° C.

OBJECTS OF THE INVENTION

One object of the present invention is to provide new and improved practical techniques for conducting the enzymatic isomerization of dextrose to levulose on a continuous basis.

Another object of the invention is to provide practical processes for the isomerization of starch hydrolysates or dextrose solutions to levulose-bearing products, that are more attractive for commercial exploitation than prior art processes.

DEFINITIONS

Because of the plethora of terms that are in common use in the art, a few definitions are made to simplify the present application and permit it to be more concise.

D.E.: The term "D.E." is an abbreviation for "dextrose equivalent," and these terms are used interchangeably to refer to the reducing sugar content of a material calculated as dextrose and expressed as percent of total solids.

Starch Hydrolysate: The term "starch hydrolysate" is used in a general way to refer to a syrup or dry product that is made by the hydrolysis of starch. Such a product may be made by acid or enzymatic hydrolysis, or by a combination of acid and enzymatic hydrolysis. A preferred type of starch hydrolysate for use for isomerization in accordance with the present invention is produced by acid or enzyme thinning to a D.E. of 10 or less, followed by enzymatic saccharification to a D.E. above 95, and preferably above 97.5.

Glucose and Dextrose: Medium D.E. starch hydrolysates are commonly referred to in the art as "glucose," whether the starch hydrolysate is in the form of a syrup or in the form of solids. The term "dextrose" is commonly reserved for the refined crystalline monosaccharide that is recovered from a high D.E. starch hydrolysate, or for D-glucose as a constituent of starch hydrolysates. As used hereafter, the term "dextrose" will be used to embrace this monosaccharide in any form, in solution or dry, as a constituent of a starch hydrolysate syrup, syrup solids, or in refined crystalline form.

Fructose and Levulose: The terms "fructose" and "levulose" are generally employed interchangeably in the art to refer to a particular isomer of dextrose that is sweeter than dextrose. This isomer is found in honey and in invert sugar, along with dextrose, and it is valuable because of its sweetness. The term "levulose" will be used to refer to this monosaccharide.

The enzyme: The enzyme that isomerizes dextrose to levulose has been referred to in the art by several names. It is referred to in the Marshall U.S. Pat. No. 2,950,228, as xylose isomerase, because it isomerizes xylose to xylulose. This activity is in addition to its ability to isomerize dextrose to levulose. It has also been referred to in the art as dextrose isomerase and glucose isomerase. The term "xylose isomerase" will be used herein, since investigations have revealed that xylose is the natural substrate of the isomerase.

Enzyme preparation: The term "enzyme preparation" is used to refer to any composition of matter that exhibits the desired xylose isomerase enzymatic activity. The term is used to refer, for example, to live whole cells, dried cells, cell extracts, and refined and concentrated preparations derived from the cells. Enzyme preparations may be either in dry or liquid form. Since this invention is concerned with continuous processes, the enzyme preparation will always be employed in some immobilized form. For example, the enzyme preparation may be dispersed in a starch hydrolysate solution, but may be retained in that solution, while desired end products are selectively permitted to discharge from the solution through a selective membrane by ultrafiltration techniques. Alternatively, the enzyme preparation may be bound to an insoluble matrix. The three principal methods for binding enzymes to matrices are by ordinary covalent chemical linkages, by adsorption, and by entrapment of the enzyme within a gel lattice having pores large enough to allow the molecules of the substrate and of the product to pass freely, but small enough to retain the enzyme.

Units: All parts and percentages are by weight, and on as is basis, unless expressly stated to be otherwise.

Isomerase unit: One isomerase unit is defined as the amount of enzyme activity that is required to produce one micromole of levulose per minute under the isomerization conditions described hereafter under the heading, "Assay of Isomerase Activity."

Streptomyces: This term refers to a genus of microorganisms of the order of Actinomycetales. These microorganisms are serial mycelium-producing actinomycetes. The genus is well recognized. Some of its important distinguishing characteristics are described, for example, in the text, "The Actinomycetes," by Selman A. Waksman, The Ronald Press Company, New York, 1967, page 135 et seq.

BRIEF SUMMARY OF THE INVENTION

We have now discovered a practical, continuous process for the isomerization of dextrose to levulose that has several attendant advantages.

Generally, the process of the invention involves conducting the isomerization at an initial, fairly constant temperature of at least 50° C, followed by increasing the operating temperature, either in several increments or in a single step, to a value that is 5° C or more higher than the initial operating temperature, to an operating temperature not exceeding 80° C.

In greater detail, in one preferred mode for practicing the invention, the process involves subjecting a stream of a solution containing dextrose to the action of an immobilized enzyme preparation at a pH of at least 7.0 and preferably in the range from pH 7.5 to 8.5, and at a temperature level of at least 50° C but that is at least 10° C below the temperature at which rapid inactivation of the enzyme occurs, during an initial isomerization phase. For enzyme preparations derived from microorganisms of the Streptomyces genus, ordinarily the temperature above which rapid inactivation of the enzyme preparation can be observed is about 70° C, so that the preferred operating temperature during the initial phase of isomerization is about 60° C or lower, that is, preferably 50° C to 60° C. At temperatures in the range from 50° C to 60° C, some enzyme inactivation occurs, but the rate of inactivation is low relative to the rate of inactivation at 70° C. After some material loss of enzyme activity is observed after operating in the range from 50° C to 60° C or so, the temperature is raised at least about 5° C, either gradually, in increments of 2°–3° C or less, as needed to maintain the desired ketose level in the product, or alternatively, the temperature may be raised at least 5° C in a single step. Preferably, however, the increase in temperature for the second phase of operation is at least about 10° C, preferably through gradual or small incremental increases in operating temperature.

Among the objectives and advantages of the present invention are better enzyme stability, more desirable carbohydrate content of the isomerized product, improved efficiency as compared to batch conversions, and operating economy.

ASSAY OF ISOMERASE ACTIVITY

The assay procedure involves making a spectrophotometric determination of the ketose produced from a glucose solution under a standardized set of conditions.

A stock solution is made up in the following manner:

Table 1

Stock Solution for Assay

| Component | Amount |
|---|---|
| 0.1 M MgSO$_4$ 7H$_2$O | 1 ml. |
| 0.01 M CoCl$_2$ 6H$_2$O | 1 ml. |
| 1 M Phosphate buffer, pH 7.5 | 0.5 ml. |
| Anhydrous D-glucose | 1.44 grams |
| Distilled water | To make up a total volume of 7.5 ml. |

The enzyme preparation to be assayed is first sonicated or otherwise treated as necessary to put the enzyme in a form suitable for assay and then is diluted to contain from 1 to 6 isomerase units per ml.

An enzymatic isomerization is conducted by adding 1 ml. of the enzyme preparation to 3 ml. of the stock solution, and incubating for 30 minutes at 60° C. At the end of the incubation period, a 1 ml. aliquot is taken and quenched in a 9 ml. volume of 0.5 N perchloric acid. The quenched aliquot is then diluted to a total volume of 250 ml. As a control, for comparative purposes, a glucose blank is also run by substituting 1 ml. of water for the 1 ml. of the enzyme preparation in solution form, at the beginning of the incubation period.

The ketose is then determined by a cysteine-sulfuric acid method. For the purposes of this assay, one isomerase unit is defined as the amount of enzyme activity that is required to produce one micromole of levulose per minute under the isomerization conditions described.

DETAILED DESCRIPTION OF THE INVENTION

EXAMPLE 1

Continuous Isomerization Utilizing A fixed Bed of Microbial Cells: Single Step Temperature Adjustment For this demonstration of the invention, a jacketed column was used. The jacket was connected to a source of hot water, for controlling column temperature during isomerization.

A strain of a microorganism of the Streptomyces genus, that is recognized as a good isomerate producer, was grown under submerged, aerobic conditions on a medium containing xylose, to produce intracellular isomerase.

After fermentation, magnesium hydroxide was added to the fermenter broth in the ratio of two parts by weight of magnesium hydroxide for each one part by weight of the cell mass in the broth. The slurry thus obtained was filtered, and the filter cake was then dried in an open pan at room temperature. The activity of the dry enzyme preparation thus obtained was 330 units per gram.

The dry enzyme preparation was dispersed in a 50 percent W/V solution of dextrose. The slurry was then placed in the jacketed column, and as the slurry was added to the column, small glass beads, approximately 3 mm. in diameter, were added simultaneously. The glass beads served as a support and also prevented the enzyme preparation from packing and thus plugging up the column. In this fashion, approximately 750 units of the enzyme were charged to the column.

A dextrose syrup at 50 percent W/V concentration was adjusted to a pH in the range from 7.0 to 7.5 by adding magnesium hydroxide. The syrup was sparged with nitrogen, and was then fed to the top of the column under a nitrogen atmosphere.

The isomerized product was collected in aliquots of 15 ml., in test tubes. The test tubes each contained about 5 ml. of 0.5 N perchloric acid to inactivate any soluble isomerase that might be present in the product.

The temperature of the column was maintained at about 60° C during an initial phase of operation. The flow rate of dextrose solution through the column was maintained at a substantially uniform rate, and the ketose content of the effluent was 40 percent to 50 percent on a dry solids basis.

The isomerization was conducted in this manner for nine days before a substantial decrease in enzyme activity became apparent as evidenced by a dropping off in the ketose value observed in the effluent. During that initial phase of operation, the average ketose content of the effluent was 38.7 percent.

At the end of this initial phase of operation, the temperature of the column was increased (from the initial level of 60° C) to 70° C in a single step. Isomerization was then continued, at the increased temperature, for an additional period of 24 hours. The ketose content of the product averaged out at about 49 percent, for the second phase of operation. The results are summarized below in Table 2.

Table 2

Continuous Isomerization:

Single Step Temperature Adjustment

| Time Days | Temperature °C | Throughput Bed Volumes per hour | Output of approximately 42% d.b. Levulose Product (lbs. d.s. per cu. ft. of bed) | |
|---|---|---|---|---|
| | | | Expected at 60°C | Obtained |
| 1 | 60 | 1.27 | 951 | 951 |
| 2 | 60 | 1.27 | 951 | 951 |
| 3 | 60 | 1.27 | 951 | 951 |
| 4 | 60 | 1.27 | 951 | 951 |
| 5 | 60 | 1.25 | 936 | 936 |
| 6 | 60 | 1.17 | 876 | 876 |
| 7 | 60 | 1.10 | 823 | 823 |
| 8 | 60 | 1.03 | 771 | 771 |
| 9 | 70 | 1.65 | 734 | 1235 |
| 10 | 70 | 1.65 | 681 | 1235 |

When the isomerization was repeated with an enzyme preparation prepared from a mixture of diatomaceous earth with the microbial cells, closely comparable results were obtained.

EXAMPLE 2

Continuous Isomerization Utilizing A Fixed Bed: Small Step Temperature Adjustments Intracellular isomerase was produced by growing a Streptomyces culture under submerged, aerobic conditions on a xylose-containing medium.

At the end of the fermentation, diatomaceous earth filter aid was added to the fermentation liquor in the ratio of 2 parts of the filter aid to 1 part of the microorganism cells, dry cell weight. The cell-diatomaceous earth mixture was separated by filtration, washed, and dried, for use as the enzyme preparation.

This enzyme preparation was suspended in dextrose solution and fed into a jacketed column. The lower outlet of the column was connected to a vacuum source to obtain a compact bed. When filled, the column contained 22 lbs. (dry weight) of the enzyme preparation (i.e., the cell-filter aid mixture) per cu. ft. of column volume.

Water at 60° C was passed through the jacket of the column. A solution containing 500 grams d.s. per liter of 95 D.E. starch hydrolysate containing 92 percent dextrose, dry basis, adjusted to pH 7.8 with magnesium hydroxide, was supplied continuously to the column, using pressure to control the flow rate. The flow rate was adjusted to maintain 42 percent (dry basis) levulose in the effluent from the column.

After 6 days of operation, the output volume rate had been dropped to 66 percent of the original value in order to maintain the 42 percent (dry basis) levulose content. Thereafter, the temperature was increased periodically, as shown in the table, to maintain the output rate of 42 percent levulose product at not less than 66 percent of the original output rate. As shown in the table, the total output quantity obtained in a period of 14 days by means of the increase in temperature was 41 percent greater than the total output which would have been obtained had the temperature been held constant at 60° C.

Table 3

Fixed Bed Isomerization With Small Step Temperature Increases

| (lbs. d.s. per cu. ft. of bed) | | Output of 42% d.b. Levulose Product | |
|---|---|---|---|
| Days | Temperature °C | Expected at 60°C | Obtained |
| 1 | 60 | 787 | 787 |
| 2 | 60 | 787 | 787 |
| 3 | 60 | 787 | 787 |
| 4 | 60 | 787 | 787 |
| 5 | 60 | 622 | 622 |
| 6 | 60 | 516 | 516 |
| 7 | 62 | 418 | 590 |
| 8 | 62 | 343 | 516 |
| 9 | 62 | 286 | 516 |
| 10 | 64 | 233 | 509 |
| 11 | 64 | 187 | 509 |
| 12 | 66 | 158 | 473 |
| 13 | 68 | 127 | 674 |
| 14 | 70 | 106 | 622 |
| | TOTAL | 6144 | 8695 |

EXAMPLE 3

Batch Isomerization Compared To Immobilized Fixed Bed Continuous Isomerization

A fermentation is conducted with a microorganism of the Streptomyces genus, in a culture medium containing xylose, to produce isomerase. The cells are recovered from the fermentation broth by adding diatomaceous earth to the fermentation broth and filtering.

A portion of the wet filter cake is utilized as an enzyme preparation for conducting a batch isomerization with a 95 D.E. corn starch hydrolysate. Residence time in the stirred reactor is 50 hours at pH 6.25.

A separate portion of the same enzyme preparation is also employed as a fixed bed enzyme source, for conducting a continuous isomerization. Average residence time in the column is between one and 2 hours, at pH 8.

The batch isomerization is conducted at 70° C. The continuous isomerization is conducted at 60° C over an initial period of time, until substantial inactivation of the enzyme is observed, whereupon the column temperature is raised to 70° C.

The results are as reported in Table 4, below.

Table 4

Batch vs. Column Isomerization Of A 95 D.E. Hydrolysate

| Batch, 50 Hrs., pH 6.25 | Feed | Isomerisate | Difference |
|---|---|---|---|
| Ash, % d.b. | 1.0 | 1.8 | 0.8 |
| Org. Acid, % d.b. | 0.05 | 0.08 | 0.03 |
| Color | 4 | 200 | 196 |
| Column, 1-2 Hrs., pH 8 | Feed | Isomerisate | Difference |
| Ash, % d.b. | 0.5 | 0.6 | 0.1 |
| Org. Acid, % d.b. | 0.03 | 0.04 | 0.01 |
| Color | 4 | 11 | 7 |

The batch isomerization is conducted at pH 6.25 because at pH values above 7.0, during the long residence time that is required for the batch process, the carbohydrate composition of the end product tends to be somewhat undesirable. The conditions employed for this comparison are believed to be reasonably close to the optimum for each type of process, and the comparison is highly favorable to the continuous process.

In terms of enzyme economy, the continuous process is much more efficient and involves the usage of a much lower amount of enzyme activity per unit of levulose product produced.

EXAMPLE 4

Stabilized Enzyme

As the isomerization temperature is increased, reaction rate increases, but so does inactivation of the isomerase. At some temperature, the rate of inactivation will exceed the increased reaction rate, and at this temperature, the product produced per unit time will decrease.

We have found a novel stabilizing technique for imparting enhanced thermal stability to isomerase. The use of our stabilized isomerase, coupled with temperature programmed operation, permits the production of high levulose syrups without excessive enzyme loss.

To produce stabilized isomerase, a very high purity enzyme is recovered from the cells. A Streptomyces-derived enzyme is preferred but the source microorganism may be any satisfactory producer of enzyme. The enzyme is placed in solution and is passed over a bed of particulate basic magnesium carbonate. The enzyme is efficiently absorbed and the product is a very stable, active form of the enzyme.

Operation at higher temperatures is conducive to higher levulose contents because the reaction rate is increased and the equilibrium levulose content is higher at the higher temperature. For example, equilibrium levulose contents at some elevated temperatures are listed below.

Table 5

| Isomerization Temperatures | Levulose Content, % Dry Basis Based on Initial Dextrose |
|---|---|
| 60°C | 51.2% |
| 70°C | 52.6% |
| 80°C | 54.0% |

When a column was packed with our stabilized enzyme, and a stream of a dextrose solution was passed through the column, good conversion was observed. Long enzyme life was obtained despite prolonged operations at 60° C and above, while levulose contents in the effluent were in at least 50 percent of total sugar present, dry basis. The isomerization was conducted at pH 8, and the product had exceptionally good color, was low in organic acid content, and was low in undesirable carbohydrates. The high operating pH promotes enzyme stability despite high operating temperatures, and the high temperatures permit a very short residence time in the column, thus minimizing investment requirements and inventory of in process material.

CONCLUSION

The invention can also be practised successfully with enzyme preparations of a different kind, although generally, the use of intact cells is preferred. Thus, in another demonstration of the invention, dried intact cells are converted to fine powder in a Waring blender. A buffer solution is prepared by dissolving a small amount of the surfactant Tween 80 in a 1.0 M glycine solution. The buffer solution is adjusted to pH 8.0 by adding a small amount of sodium hydroxide. A slurry is then prepared by adding 200 grams of the dry, fine powdered cells to 1,000 ml. of the buffer solution. The slurry is then filtered. 793 ml. of filtrate is recovered, having an activity of 17.5 units per ml.

One part of this enzyme solution is then anchored on a porous glass carrier having a high surface area and reactive silanol groups, as described in U.S. Pat. No. 3,556,945, granted Jan. 19, 1971. A second portion of the solution is absorbed on activated charcoal granules. Both forms of the enzyme can then be employed in practising continuous isomerization in accordance with the invention, utilizing the general techniques described above.

ADVANTAGES

One of the most important advantages of the practice of the present invention is lower enzyme cost per unit of levulose produced. As compared to batch isomerization, the same amount of enzyme, when utilized in accordance with the present invention, produces more levulose product than batch processing. Up to three times more product has been produced from a given amount of enzyme preparation, by practising the present invention, then is obtained when optimum processing batch techniques are employed.

In addition, there are many other important advantages. Generally speaking, continuous isomerization techniques utilizing an immobilized enzyme preparation permit much shorter isomerization times or residence times, that is, times of contact between the supply solution and the enzyme preparation. This means that the sugars, that are being processed, are subjected to the elevated processing temperature for a shorter time, and there is less thermal degradation. For these reasons, the finished product contains fewer color bodies, so that product color is superior and refining costs are lower. In addition, fewer organic acids are formed. Moreover, the carbohydrate composition of the end product is more desirable. Also, because of the shorter processing time, smaller inventories are required in process.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the appended claims.

What is claimed is:

1. An enzymatic isomerization process for the conversion of dextrose to levulose, comprising:
   in an initial operating phase, subjecting a solution containing dextrose to the action of a xylose isomerase enzyme preparation at an operating temperature of at least 50° C., but not more than 70° C., then
   increasing the temperature to a value that is at least 5° higher than the temperature during the initial operating phase, and continuing the isomerization process at said increased temperature.

2. A process in accordance with claim 1, wherein the temperature during the initial operating phase, is in the range from 50° C to 65° C.

3. A process in accordance with claim 1, wherein the temperature, after the initial operating phase, is increased gradually.

4. A process in accordance with claim 1, wherein the temperature, after the initial operating phase, is increased in a single step increment.

5. A process in accordance with claim 2, wherein the operating temperature, after the initial operating phase, does not exceed 80° C.

6. A continuous process for the isomerization of dextrose to levulose with a xylose isomerase enzyme preparation that comprises:
   in an initial operating phase, passing a stream of a solution containing dextrose into contact with an immobilized xylose isomerase enzyme preparation for an initial period of time at an operating temperature of at least 50° C, and then
   continuing the operation at a temperature higher than the temperature employed during the initial phase but that does not exceed 80° C, to maintain a desired ketose level in the effluent.

7. A process in accordance with claim 6, wherein the dextrose solution is a starch hydrolysate.

8. A process in accordance with claim 7, wherein the starch hydrolysate has a D.E. of at least 95.

9. A process in accordance with claim 6, wherein the dextrose solution is one prepared by dissolving crystalline dextrose in an aqueous medium.

10. A process in accordance with claim 6, wherein the stream of solution is passed into contact with the enzyme preparation at a pH of at least 7.

11. A process in accordance with claim 6, wherein the operating temperature during the initial phase of operations is in the range from 50° C to 65° C.

12. A process in accordance with claim 11, wherein the pH is maintained in the range from about 7.5 to 8.5.

13. A process in accordance with claim 12, wherein the enzyme preparation is derived from an organism of the Streptomyces genus.

14. A process in accordance with claim 6 comprising:

continuing the operation in the second phase by raising the temperature in small increments.

15. A process in accordance with claim 6 comprising:

continuing the operation in its second phase by raising the temperature at least 5° C higher than the operating temperature during the initial phase.

16. A continuous process for the isomerization of a solution containing dextrose, with a xylose isomerase enzyme preparation, that comprises:

in an initial operating phase, passing a stream of a solution containing dextrose in an aqueous medium into contact with an immobilized xylose isomerase enzyme preparation derived from a microorganism of the Streptomyces genus at a pH of at least 7.0 and at a temperature of at least 50° C and up to about 65° C, then continuing the isomerization at a pH of at least 7.0 but at a temperature that is higher than the temperature employed during the initial phase but that does not exceed 80° C, to maintain a desired ketose level in the effluent, and recovering a levulose-bearing product.

17. A process in accordance with claim 16, wherein the xylose isomerase preparation comprises intact cells of the microorganism.

18. A process in accordance with claim 16, wherein the isomerization is conducted at a pH in the range from about 7.5 to about 8.5.

19. A process in accordance with claim 18, wherein the dextrose solution initial material is a corn starch hydrolysate having a D.E. of at least 95.

20. A process in accordance with claim 16 comprising:

continuing the isomerization by raising the temperature in small increments.

21. A process in accordance with claim 16 comprising:

continuing the isomerization by raising the temperature at least 5° C higher than the operating temperature during the initial phase.

22. A process in accordance with claim 19 comprising:

continuing the isomerization by raising the temperature at least 10° C higher than the operating temperature during the initial phase.

23. A process for the enzymatic conversion of dextrose to levulose, comprising:

1. in an initial operating phase, contacting a solution of dextrose to the action of a stabilized xylose isomerase enzyme preparation adsorbed on particulate basic magnesium carbonate at an operating temperature of at least about 50° C, but not more than 70° C, and 2. in a subsequent operating phase, increasing the temperature to a value that is at least 5° higher than the temperature during the initial operating phase.

24. The process of claim 23, wherein the xylose isomerase enzyme is derived from a microorganism of the genus Streptomyces.

25. The process of claim 23, wherein said stabilized enzyme is packed in a column.

* * * * *